United States Patent [19]

Bowes

[11] Patent Number: 4,547,485

[45] Date of Patent: Oct. 15, 1985

[54] DEMETALATION CATALYST AND A METHOD FOR ITS PREPARATION

[75] Inventor: Emmerson Bowes, Hopewell, N.J.

[73] Assignee: Mobil Oil Corporation, New York, N.Y.

[21] Appl. No.: 654,901

[22] Filed: Sep. 27, 1984

Related U.S. Application Data

[63] Continuation-in-part of Ser. No. 490,074, Apr. 29, 1983, abandoned.

[51] Int. Cl.⁴ .................. B01J 21/04; B01J 23/85
[52] U.S. Cl. .................... 502/314; 502/315; 502/439
[58] Field of Search .............. 502/314, 315, 355, 439; 208/216 PP

[56] References Cited

U.S. PATENT DOCUMENTS

| | | | |
|---|---|---|---|
| 3,770,617 | 11/1973 | Riley et al. | 208/216 PP |
| 4,089,774 | 5/1978 | Oleck et al. | 208/89 |
| 4,225,421 | 9/1980 | Hensley et al. | 208/216 PP |
| 4,271,042 | 6/1981 | Oleck et al. | 502/314 |

Primary Examiner—W. J. Shine
Attorney, Agent, or Firm—Alexander J. McKillop; Michael G. Gilman; James F. Powers, Jr.

[57] ABSTRACT

Disclosed is a method for preparing an alumina composition having two concentrations pore sizes, one in the 90–200 Angstrom range and the other in the 1000 to 5000 Angstrom range. Method is based on heating one type of alumina to 1400° F., mixing it with unheated alumina and reheating to the 1400° F. temperature.

5 Claims, No Drawings

DEMETALATION CATALYST AND A METHOD FOR ITS PREPARATION

This is a continuation-in-part of my copending U.S. application Ser. No. 490,074, filed Apr. 29, 1983, which is incorporated herein by reference, now abandoned. Related applications are Ser. Nos. 490,075 and 490,076, each filed on Apr. 29, 1983.

BACKGROUND OF THE INVENTION

This invention is concerned with catalytic processes for demetalizing and desulfurizing petroleum oils, particularly the heavy petroleum ends and residual fractions with undesirably high metals and/or sulfur and/or Conradson carbon residue contents.

DESCRIPTION OF THE PRIOR ART

Residual petroleum oil fractions produced by atmospheric or vacuum distillation of crude petroleum are characterized by relatively high metals and sulfur content. This comes about because practically all of the metals present in the original crude become concentrated in the residual fraction and a disproportionate amount of sulfur in the original crude oil also remains in the residual fraction. Principal metal contaminants are nickel and vanadium, with iron and small amounts of copper also sometimes present. Additionally, trace amounts of zinc and sodium are found in some feedstocks. The high metals content of the residual fractions generally preclude their effective use as charge stocks for subsequent catalytic processing such as catalytic cracking and hydrocracking. The metal contaminants deposit on the special catalysts for these processes and cause the premature aging of the catalyst and/or formation of inordinate amounts of coke, dry gas and hydrogen.

U.S. Pat. No. 4,035,287 discloses a method for desulfurizing oils which comprises contacting the oil with a solvent selective for low molecular weight aromatics thereby producing a low-sulfur, high-metals content raffinate and a low-metals, high-sulfur metals extract. U.S. Pat. No. 4,271,042 discloses a process for removing metal and sulfur contaminants from oil fractions by catalytic contact with specified metal sulfides or oxides supported on an alumina that contains at least 45% of its pore volume in pores of 30–150 Angstroms in diameter. These two patents are incorporated herein by reference.

SUMMARY OF THE INVENTION

It has now been found that a hydrocarbon oil containing both metals and sulfur contaminants may be effectively demetalized and desulfurized by adding to the oil a selected aromatic solvent and subsequently contacting the oil with hydrogen and with an alumina characterized as a dual pore size distribution alumina. The process is conducted under conditions sufficient to effect demetalation and desulfurization. The term "dual pore size distribution alumina", as used herein, is defined as an alumina showing two distinct concentrations of pore sizes, one with pore sizes concentrated in the range of 90 to 200 Angstrom units with a pore volume in this region of between 0.35 and 0.7 (preferably 0.5) cc per gram and a second in the range of 1000 to 5000 Angstrom units and a pore volume of 0.2 cc/gram. The desired pore size distributions are obtained by precalcining part of the alumina powder before mixing with the remainder and forming the catalyst particle. The precalcined alumina is present in the mixture in a concentration of between 35 and 80 (preferably 65) parts by weight and the uncalcined alumina is present in a concentration of between 65 and 20 (preferably 35). The mixture of precalcined and uncalcined alumina subsequently is calcined to provide the dual pore size alumina.

DESCRIPTION OF THE INVENTION

The alumina composition of this invention having the dual pore size distribution noted is prepared by calcining preferably an alpha alumina monohydrate or pseudo boehmite at a temperature of about 1400° F. This powder is then mixed with 25% to 185% of its own weight on an anhydrous basis, of the uncalcined alpha-alumina monohydrate. The composite is pelleted or extruded and recalcined for a period of 1 to 10 hours, preferably 3 hours, at a temperature of about 1400° F. The ratio of the twice calcined product to the once calcined product can be on the order of 65 to 35 parts by weight. This is the most preferred composition. This procedure, involving a first calcination, mixing and a second calcination, as prescribed above forms the alumina portion of the catalyst of this invention. Impregnation with salts of the hereinabove described metals may be done in various stages in preparation.

The catalyst of this invention includes a hydrogenation component deposited on a dual pore size distribution alumina. The hydrogenating component can be any material or combination thereof that is effective to hydrogenate and desulfurize the charge stock under the reaction conditions utilized. For example, the hydrogenating component can be at least one member of the group consisting of Group VI and Group VIII metals in a form capable of promoting hydrogenation reaction. Especially effective catalysts for the purposes of this invention are those comprising molybdenum and at least one member of the iron group metals. Preferred catalysts of this class are those containing about 2 to about 10 percent by weight cobalt and about 5 to about 20 percent by weight molybdenum, but other combinations of iron group metals and molybdenum such as iron, nickel and molybdenum, as well as combinations of nickel and molybdenum, cobalt and molybdenum, nickel and tungsten or other Group VI or Group VIII metals of the Periodic Table taken singly or in combination can be used. The hydrogenating components of the catalysts of this invention can be employed is sulfided or unsulfided form.

The hydrocarbon feed utilized with the alumina composition of this invention can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling about 650° F. and containing a substantial quantity of asphaltic materials. Thus, the charge stock can be one having an initial or 5 percent boiling point somewhat below 650° F., provided that a substantial proportion, for example, about 70 or 80 percent by volume, of its hydrocarbon components boils about 650° F. A hydrocarbon stock having a 50 percent boiling point of about 900° F. and which contains asphaltic materials, 4% by weight sulfur and 51 ppm nickel and vanadium is illustrative of such charge stock.

The charge stock is mixed with an aromatic solvent which can be benzene, toluene, other substituted benzenes, light cycle oil reformates, and other aromatic streams derived from refinery operations. The volumetric ratio of aromatic solvent to feed preferably is between 1:1 and 3:1. The mixture is then charged to a catalyst bed along with hydrogen under conditions conducive to demetalation and desulfurization.

Typical process conditions may be defined as contacting a metal and/or sulfur-containing charge stock with the catalyst described herein at a hydrogen pressure of about 300 to 3000 psig at a temperature of 600° to 850° F., and 0.1 to 5 LHSV (i.e., 0.1 to 5 volumes of charge stock per volume of catalyst per hour).

The hydrogen gas which is used during the hydrodemetalation, hydrodesulfurization, and CCR removal is circulated at a rate between about 1,000 and 15,000 s.c.f./bbl of feed and preferably between about 2,000 and 8,000 s.c.f./bbl. The hydrogen purity may vary from about 60 to 100 percent. If the hydrogen is recycled, which is customary, it is desirable to provide for bleeding of a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

For the purpose of this invention, it is preferred to use catalyst particles such as 1/32-inch extrudate or the equivalent disposed in fixed beds.

Although this method of demetalation and desulfurization is useful in a continuous flow system it can also be utilized in batch processes in which the aromatic solvent or aromatic refinery stream, residual oil and alumina are contacted in the proportions previously discussed and for periods up to one-half to 4 hours.

EXAMPLES

Tests were run with five heavy oil samples of the following sulfur, nitrogen and nickel and vanadium content.

TABLE 1

| | PROPERTIES OF FEEDS | | | |
|---|---|---|---|---|
| | | Wt % | ppm | |
| Sample | | S | Ni | V |
| A | Arab Lt. Vac. Resid | 4.0 | 17 | 70 |
| B | Cold Lake Atm. Resid, Light Cycle Oil | 2.3 | 24 | 57 |
| C | Arab Hvy. Topped Crude | 3.5 | 18 | 60 |
| D | Arab Hvy. Resid, Light Cycle Oil | 2.3 | 15 | 40 |
| E | Arab Hvy. Resid | 5.2 | 45 | 145 |

The A and E samples were mixed with ortho-xylene in ratios of 1:8 and 1:4 respectively. In the B and D samples the resids were mixed with an aromatic light cycle oil in a ratio of 1 to 3. Sample C was a blank run without any aromatics added.

The samples were demetalized and desulfurized by pressuring them in an autoclave for one hour at 350° C. and 1000° psi. The partial pressure of hydrogen was 1000 psig at 25° C. Results are shown below in Table 2.

TABLE 2

DESULFURIZATION AND DEMETALATION OF PETROLEUM RESIDS IN AROMATICS SOLVENTS
Autoclave runs 1 h, 350° C., 1000 psi H$_2$ (initial)

| Run | | % Removed | | | H$_2$ consumption scft/barrel[1] |
|---|---|---|---|---|---|
| | | S | Ni | V | |
| A | Arabian Light Vac. Resid[2] in o-xylene | | | | |
| | (1) HSD 1441[4] | 65 | 58 | 77 | (1107) |
| | (2) LPS Catalyst[5] | 67 | 99 | 98 | (576) |
| B | Cold Lake Amt. Resid, LCO[2,3] | | | | |
| | (3) HDS 1441[4] | 70 | 77 | 67 | 532 |
| | (4) LPS[5] | 72 | 93 | 96 | 468 |
| | (5) Dual Distrib. catalyst[6] | 72 | 93 | 97 | 320 |
| C | Arabian Heavy Topped Crude[2] | | | | |
| | (6) HDS 1441[4] | 43 | 39 | 35 | 494 |
| | (7) LPS[5] | 29 | 59 | 50 | 338 |
| | (8) DD[6] | 29 | 59 | 52 | 245 |
| D | Arabian Heavy Resid Cycle Oil[2] | | | | |
| | (9) HDS 1441[4] | 53 | 67 | 50 | — |
| | (10) LPS[5] | 53 | 89 | 93 | 367 |
| | (11) DD[6] | 60 | 85 | 83 | 241 |
| E | Arabian Heavy Resid[2] in o-xylene | | | | |
| | (12) HDS 1441[4] | 49 | 49 | 38 | (802) |
| | (13) LPS[5] | 59 | 98 | 97 | (343) |

[1]Numbers in parenthesis are scft/bbl of resid when solvent is unreactive
[2]Arabian Light Vacuum Residual.
[3]LCO = Light Cycle Oil
[4]HDS 1441 catalyst average pore 70-80 A
[5]LPS catalyst average pore 220 A
[6]Dual Distrib. catalyst average pore size 220 A in the matrix prepared as described herein.

In Runs (1), (3), (6), (9) and (12) the catalyst was a commercial hydrodesulfurization catalyst having an average pore size diameter of 70—80 Angstroms.

In runs (2), (4), (7), (10) and (13) the catalyst was a large pore size catalyst useful in demetalizing and desulfurizing which is the subject of copending application Ser. No. 490,075, filed Apr. 29, 1983. Runs (5), (8) and (11) were run with the dual pore size distribution alumina of this invention.

In comparing runs (5), (8) and (11) to runs (3), (6), (9) and (12), it is readily apparent that the samples were more readily demetalized by the dual pore size alumina without any reduction in desulfurization. It should be noted in runs (6) and (8) demetalization was not nearly as effective in the absence of aromatics. In runs (5), (8) and (11) substantially less hydrogen was used to achieve the improved desulfurization and demetalization.

It will be readily apparent to those skilled in the art that the effluent product obtained from contacting the charge stock with aromatic solvents and hydrogen can be fractionated into a product stream of residual oil having a greatly reduced sulfur and metals content.

I claim:

1. A method for preparing an alumina comprising the steps of:
    (a) heating an uncalcined alpha-alumina monohydrate to a temperature of about 1400° F. to provide a calcined alumina product;
    (b) mixing said calcined alumina product with about 25 to about 185 percent of its own weight on an anhydrous basis of uncalcined alpha-alumina monohydrate; and
    (c) heating the resultant mixture to a temperature of about 1400° F.

2. The method of claim 1 wherein said uncalcined alpha alumina monohydrate of (a) is pseudo boehmite.

3. The composition prepared by the method of claim 1 wherein said mixture also contains a catalyst of one or more metals of Group VIII and of one or more metals of Group VIB.

4. The composition of claim 3 wherein said Group VIB metal is selected from the group consisting of molybdenum and tungsten.

5. The composition of claim 3 wherein said Group VIII metal is selected from the group consisting of cobalt and nickel.

* * * * *